Figure 1:
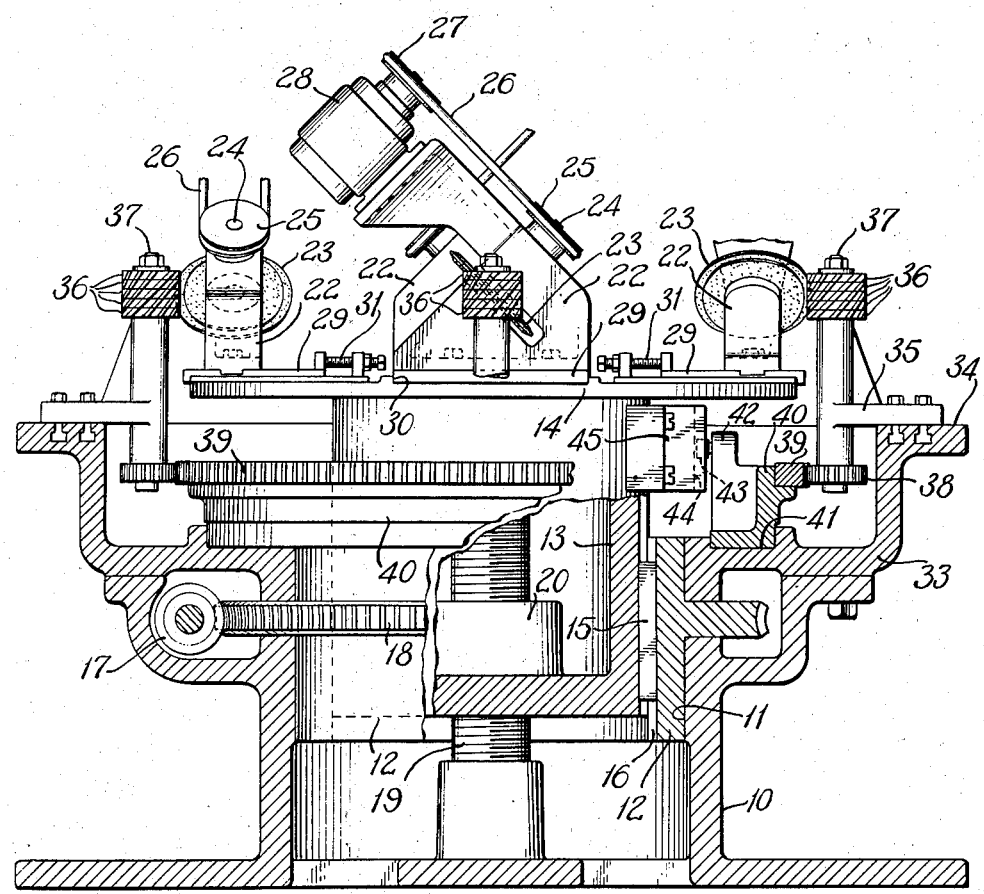

Jan. 8, 1935.   A. L. DE LEEUW   1,986,797
MACHINE FOR CUTTING OR GRINDING HELICAL GEARS
Filed March 9, 1934

INVENTOR
ADOLPH L. DE LEEUW
BY
ATTORNEY

Patented Jan. 8, 1935

1,986,797

UNITED STATES PATENT OFFICE 1,986,797

MACHINE FOR CUTTING OR GRINDING HELICAL GEARS

Adolph L. De Leeuw, Plainfield, N. J.

Application March 9, 1934, Serial No. 714,748

9 Claims. (Cl. 51—52)

My invention relates to improvements in machines for cutting or grinding helical gears.

The present invention relates more particularly to machines of the general type shown in my Patent No. 1,666,737, issued April 17, 1928. Said patent discloses a machine adapted to grind a plurality of spur gears disposed in an annular series. The machine has a master driving gear meshing with a series of master pinions each driving a spindle on which is mounted a gear blank to be ground. A turntable coaxial with the master driving gear, carries one or more grinding wheels which, as they are revolved by the turntable, mesh with the gear blanks sequentially, the grinding wheels being simultaneously rotated in planes transverse to their plane of revolution so as to grind the blanks. The table is slowly fed axially so that the orbit of each grinding wheel is a very flat helix and hence each wheel will, in the course of a series of revolutions, traverse the entire face of each gear blank. The principle of the "hunting cog" is employed, whereby a different tooth of each gear blank is engaged at successive passage of a grinding wheel, so that at the end of said series of revolutions each tooth of each blank will have been properly ground.

The particular embodiment of my invention illustrated in said Patent No. 1,666,737, is not adapted to grind helical gears, but in a copending application Serial No. 631,042, filed August 30, 1932, I describe a machine for cutting helical gears in which rotary cutters are used, said cutters being inclined to conform to the helix angle which it is desired to cut. In addition to this, provision is made for a relative angular progression of the successive points of contact of the cutter with each tooth space of the blank, so as to develop a helical cut across the face of the blank. Although the machine of said copending application is described as a gear cutting machine, it will be obvious that the same machine may be used for grinding gear blanks by substituting grinding wheels for the cutters and driving said wheels at the requisite grinding speed.

While said copending application covers broadly a means for effecting relative angular progression of the successive points of contact of a cutter with each tooth space, the specific embodiment described and illustrated comprises a driving sleeve with the master gear fixed thereto, while the turntable bearing the cutters is splined to the sleeve. This spline is helical so that as the table is slowly carried downward by threaded engagement with a feed screw, it is angularly displaced with respect to the master gear in such degree and in such direction as to make the desired helical cuts in the blanks.

One of the drawbacks of the structure specifically described in said copending application lies in the difficulty of changing the helix angle for different gears. In fact it is necessary to replace the sleeve and the turntable with corresponding parts having a splined engagement of different helix angle and also to substitute new cutter carriages having cutters disposed at the desired helix angle. These changes are so radical that they involve virtually rebuilding the machine for each change of helix angle.

An object of the present invention is to provide a machine which may be readily set for grinding or cutting gears of different helix angles.

Usually helical gears are made in mating pairs, one being right handed and the other left handed, and it is of advantage to be able to cut or grind such pairs on the same machine. It is, therefore, a further object of the present invention to provide a machine which is readily convertible from right-hand to left-hand helical cutting or grinding, or vice versa, with a minimum of adjustment and replacement.

A more specific object of the present invention is to provide a machine in which the turntable turns with and at the same speed as the sleeve, while the master gear is driven by the turntable, through a roller fixed to said gear and engaging a helical groove in a cam block detachably secured to the turntable. In this way, a desired advance or retardation of the gear with respect to the table is obtained and may be varied by the use of different cam blocks.

Other objects and advantages of the invention will appear in the following description of a preferred embodiment and thereafter the novelty and scope of the invention will be pointed out in the claims.

Figure 2:
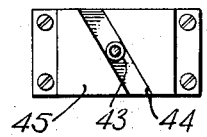

In the accompanying drawing;

Figure 1 is a view in side elevation of a machine embodying my invention, certain portions of the machine being broken away and other portions being shown in section; and Fig. 2 is a face view of a cam block controlling the relative speed of the master gear with respect to the turntable.

The machine shown in the drawing comprises a main frame 10 having a cylindrical bearing portion 11 in which rotates a sleeve 12. Fitted to slide within the sleeve is a cylinder 13 which at its upper end carries a turntable 14. The cylinder is splined to the sleeve by a key 15 which is vertically disposed in the cylinder and engages a slot 16 formed in the sleeve. A worm 17 fixed upon a main drive shaft engages a worm gear 18 fixed to or forming an integral part of the sleeve. Concentric with the cylinder 13 is a fixed screw 19 which engages a nut 20 forming part of the cylinder 13. As the sleeve 12 and cylinder 13 are rotated, the turntable 14 will be fed upward or downward, depending upon the direction of rotation of the worm 17.

Mounted on the turntable are carriages 22. In the particular machine illustrated there are four of these carriages. However, any other number of carriages may be used, but it is essential that they be disposed at equal angles apart. Mounted in each carriage is a grinding wheel 23 fixed upon a shaft 24. Each shaft 24 carries a pulley 25 which is connected by a belt 26 to a pulley 27 on the rotary member of a motor 28. The grinding wheels are set at an angle from the vertical which corresponds to the helical angle of the gears to be ground.

It will be observed that each carriage 22 has its own individual motor so that the carriage may be reversed to change the angle of the grinding wheel from right hand to left hand or vice versa. Each carriage 22 is bolted to a base plate 29 which slides radially in suitable ways 30 formed in the turntable. Thus by means of adjusting screws 31 the radial position of each grinding wheel may be adjusted.

Bolted to the main frame 10 is an annular frame member 33 which is cup-shaped with a rim in the form of a flat annular shelf 34. Brackets 35 are adjustably mounted on this shelf. Each bracket supports a stack of helical gear blanks 36 which are fixed upon a vertically disposed spindle 37. Each spindle at its lower end has a pinion 38 fixed thereto, of the same pitch diameter as that of the gear blanks supported on the upper end of the spindle. A master gear 39 engages and drives the pinions 38. This master gear is secured to an annulus 40 which turns in a suitable annular seat 41 formed in the frame member 33. A bracket 42 on the annulus carries a roller 43 which engages a helical cam groove 44 formed in a block 45 bolted to the cylinder 13.

The operation of this machine is very similar to that described in my copending application. To start with, the turntable is fed upward so that the grinding wheels as they are carried about by the table will just clear the extreme upper edges of the gear blanks. The machine is shown as grinding right-hand helical gear blanks. When grinding, the turntable is rotated clockwise by its splined engagement with the sleeve 12 and is fed downward by the screw 19, causing the grinding wheels to follow a gradually descending helical orbit and engage the gear blanks on the different spindles 37, successively. Since the gear blanks are rotated by the master pinion 39 at substantially the same peripheral speed as that of the grinding wheels in their orbital motion, there will be a rolling contact of these grinding wheels with the gear blanks. The number of teeth in the master gear (or in a segment thereof between grinding wheel positions when more than one grinding wheel is used) bears a prime relation to the number of teeth in each master pinion so that the hunting cog principle is utilized, as fully described in my Patent No. 1,666,737 and in said copending application, whereby each grinding wheel will engage a different tooth space in each gear blank at successive engagements therewith until all the tooth spaces have been engaged. As the turntable revolves it is slowly fed downward so that the successive abrasive cuts formed in the gear blanks at each revolution of the turntable will be developed across the face of the gear blanks, and because at the same time the master gear is given a slightly higher speed than that of the turntable, owing to the cam groove 44, the gear blanks will turn slightly faster than the grinding wheels revolve, so that the successive abrasive cuts will be developed helically across the face of the gear blanks.

It will be understood, of course, that the gear blanks may be of different diameters and it is merely essential that they have the same peripheral speed as that of the grinding wheels in their orbital movement with a slight increment or decrement depending upon the "hand" of the helix angle of the gear blanks. When it is desired to reverse the grinding angle for gears of reverse hand the carriages 20 are unbolted and turned through an angle of 180 degrees and then bolted again to the base plate 29 so that the grinding wheels will be disposed at a reversed angle and then the cam block 45 is replaced with another having a helical groove 44 of opposite hand. With these simple changes the machine is then in condition to grind helical gears of reverse hand.

While I have referred to this machine as a grinding machine and to the tools 23 as grinding wheels it will be understood that the same machine may be employed for roughing out or finish cutting gear blanks and that circular cutters may be substituted for the grinding wheels 23. For this reason in the claims I shall use the term "forming tool" to include not only grinding wheels but also cutters. Obviously, other changes may be made in form, construction and arrangement of various parts without departing from the spirit and scope of the following claims, and consequently the particular embodiment described is to be taken as illustrative and not limitative of my invention.

I claim:

1. A machine of the character described, comprising a master gear, an orbital series of pinions meshing therewith, means for securing a helical gear blank coaxially rigid with each pinion, a turntable, a rotary forming tool mounted thereon, means for producing a helical motion of the turntable and tool with respect to the gear blanks to progressively cut all the teeth of each blank, and a driving connection between the turntable and the master gear adapted to give the master gear a slightly different speed of rotation from that of the turntable so as to effect a helical development of the tool cuts across the face of the blank, said driving connection comprising a detachable and replaceable member for changing the helix angle of the cuts.

2. A machine of the character described, comprising a master gear, an orbital series of pinions meshing therewith, means for securing a helical gear blank coaxially rigid with each pinion, a turntable, a rotary forming tool mounted thereon, means for producing a helical motion of the turntable and tool with respect to the gear blanks to progressively cut all the teeth of each blank, and a driving connection between the turntable and the master gear adapted to give the master gear a slightly different speed of rotation from that of the turntable so as to effect a helical development of the tool cuts across the face of the blank, said driving connection comprising a cam block formed with a helical groove and detachably connected to the turntable and a roller engaging the groove and carried by the gear.

3. A machine of the character described, comprising a main frame, a turntable, means for rotating and simultaneously advancing the turntable axially with respect to the frame, a master gear coaxial with the turntable and rotatable in a fixed plane with respect to the frame, a series of master pinions meshing with the gear, means for mounting a helical gear blank coaxially rigid with each pinion, each blank being of the same pitch diameter as the pinion with which it is associated, a rotary forming tool mounted on the table in position to engage and cut the blanks successively during rotation of the turntable, the gear ratio between the master gear and the pinions being such as to bring different tooth spaces of each blank successively into engagement with the tool, means for rotating the tool in an inclined plane coinciding with the desired helix angle of the gear blanks, and a driving connection between the master gear and the turntable, said connection being controlled by axial movement of the table to give the master gear a slightly different speed of rotation from that of the turntable so that there will be a development of the points of engagement of the tool with each blank in the desired helical direction.

4. A machine of the character described, comprising a main frame, a turntable, means for rotating and simultaneously advancing the turntable axially with respect to the frame, a master gear coaxial with the turntable and rotatable in a fixed plane with respect to the frame, a series of master pinions meshing with the gear, means for mounting a helical gear blank coaxially rigid with each pinion, each blank being of the same pitch diameter as the pinion with which it is associated, a rotary forming tool mounted on the table in position to engage and cut the blanks successively during rotation of the turntable, the gear ratio of the master gear and the pinions being such as to bring different tooth spaces of each blank successively into engagement with the tool, means for rotating the tool in an inclined plane coinciding with the desired helix angle of the gear blanks, and a driving connection between the master gear and the turntable, said connection comprising a pair of interengaging members carried by said turntable and said master gear respectively, the engaging surface of one of the members being helically disposed so that by reason of the axial movement of the turntable the master gear will be given a slightly different speed of rotation from that of the turntable to effect a development of the points of engagement of the tool with each blank in the desired helical direction.

5. A machine of the character described, comprising a main frame, a turntable, means for rotating and simultaneously advancing the turntable axially with respect to the frame, a master gear coaxial with the turntable and rotatable in a fixed plane with respect to the frame, a series of master pinions meshing with the gear, means for mounting a helical gear blank coaxially rigid with each pinion, each blank being of the same pitch diameter as the pinion with which it is associated, a rotary forming tool mounted on the table in position to engage and cut the blanks successively during rotation of the turntable, the gear ratio between the master gear and the pinions being such as to bring different tooth spaces of each blank successively into engagement with the tool, means for rotating the tool in an inclined plane coinciding with the desired helix angle of the gear blanks, and a driving connection between the master gear and the turntable, said connection comprising a pair of interengaging members carried by said turntable and said master gear respectively, one of the members consisting of a detachable cam block formed with a helically disposed cam groove, and the other member consisting of a roller engaging the groove, the latter being so disposed that by reason of the axial movement of the turntable the master gear will be given a slightly different speed of rotation from that of the turntable to effect a development of the points of engagement of the tool with each blank in the desired helical direction.

6. A machine of the character described, comprising a main frame, a turntable, means for rotating and simultaneously advancing the turntable axially with respect to the frame, a master gear coaxial with the turntable and rotatable in a fixed plane with respect to the frame, a series of master pinions meshing with the gear, means for mounting a helical gear blank coaxially rigid with each pinion, each blank being of the same pitch diameter as the pinion with which it is associated, a rotary forming tool mounted on the table in position to engage and cut the blanks successively during rotation of the turntable, the gear ratio between the master gear and the pinions being such as to bring different tooth spaces of each blank successively into engagement with the tool, means for rotating the tool in an inclined plane coinciding with the desired helix angle of the gear blanks, a cam block detachably mounted on the turntable and formed with a helical groove, and a roller on the master gear engaging said groove, the latter being so disposed that by reason of the axial movement of the turntable the master gear will be given a slightly different speed of rotation from that of the turntable to effect a development of the points of engagement of the tool with each blank in the desired helical direction.

7. A machine of the character described, comprising a main frame, a turntable, means for rotating and simultaneously advancing the turntable axially with respect to the frame, a master gear coaxial with the turntable and rotatable in a fixed plane with respect to the frame, a series of master pinions meshing with said gear, means for mounting a helical gear blank coaxially rigid with each pinion, each blank being of the same pitch diameter as the pinion with which it is associated, a plurality of rotary forming tools mounted on the table in position to engage and cut the blanks successively during rotation of the turntable, means for rotating each tool in an inclined plane coinciding with the desired helix angle of the gear blanks, the tools being disposed at equal angles apart on the table, the number of teeth in a segment of the master gear embraced within an angle equal to the spacing of the tools bearing a prime ratio to the number of teeth of each master pinion, and a driving connection between the master gear and the turntable, said connection comprising a pair of engaging members carried by said turntable and said master gear respectively, one of the members consisting of a detachable cam block formed with a helically disposed groove and the other member consisting of a roller engaging the groove, the groove being so disposed that by reason of the axial movement of the turntable the master gear will be given a slightly different speed of rotation from that of the turntable to effect a development of the points of engagement of the tools with each blank in the desired helical direction.

8. A machine of the character described, comprising a main frame, a turntable, means for rotating and simultaneously advancing the turntable axially with respect to the frame, a master gear coaxial with the turntable and rotatable in a fixed plane with respect to the frame, a series of master pinions meshing with said gear, means for mounting a helical gear blank coaxially rigid with each pinion, each blank being of the same pitch diameter as the pinion with which it is associated, a plurality of rotary forming tools mounted on the table in position to engage and cut the blanks successively during rotation of the turntable, means for rotating each tool, the plane of rotation of the tool being adjustable to coincide with the desired helix angle of the gear blanks, the tools being disposed at equal angles apart on the table, the number of teeth in a segment of the master gear embraced within an angle equal to the spacing of the tools bearing a prime ratio to the number of teeth of each master pinion, and a driving connection between the master gear and the turntable, said connection comprising a pair of interengaging members carried by said turntable and said master gear respectively, one of the members consisting of a detachable cam block formed with a helically disposed groove and the other member consisting of a roller engaging the groove, the groove being so disposed that by reason of the axial movement of the turntable the master gear will be given a slightly different speed of rotation from that of the turntable to effect a development of the points of engagement of the tools with each blank in the desired helical direction.

9. A machine of the character described, comprising a main frame, a turntable, means for rotating and simultaneously advancing the turntable axially with respect to the frame, a master gear coaxial with the turntable and rotatable in a fixed plane with respect to the frame, a series of master pinions meshing with said gear, means for mounting a helical gear blank coaxially rigid with each pinion, each blank being of the same pitch diameter as the pinion with which it is associated, a carriage mounted on the table, a rotary forming tool mounted in the carriage in position to engage and cut the blanks successively during rotation of the turntable, the plane of rotation of the tool being angled to the helix angle of the blanks, a motor on the carriage for rotating the tool, the carriage being reversible on the table to reverse the angle of the tool, the gear ratio between the master gear and the master pinions being such as to bring different tooth spaces of each gear blank successively into engagement with the tool, a driving connection between the master gear and the turntable comprising a pair of interengaging members carried by said turntable and said master gear respectively, one of said members consisting of a detachable cam block formed with a helically disposed cam groove and the other member consisting of a roller engaging the groove, the groove being so disposed that by reason of the axial movement of the turntable the master gear will be given a slightly different speed of rotation from that of the turntable to effect a development of the points of engagement of the tool with each blank in the desired helical direction.

ADOLPH L. DE LEEUW.